United States Patent
Kato et al.

(10) Patent No.: US 7,327,491 B2
(45) Date of Patent: Feb. 5, 2008

(54) IMAGE PROCESSING APPARATUS, IMAGE PROCESSING METHOD, COMPUTER PROGRAM AND COMPUTER-READABLE STORAGE MEDIUM

(75) Inventors: Minako Kato, Kanagawa (JP); Takatoshi Ohta, Kanagawa (JP); Toshinori Igari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 10/259,624

(22) Filed: Sep. 30, 2002

(65) Prior Publication Data

US 2003/0067617 A1   Apr. 10, 2003

(30) Foreign Application Priority Data

Oct. 4, 2001   (JP)   ............................. 2001/308834

(51) Int. Cl.
- H04N 1/52 (2006.01)
- H04N 1/56 (2006.01)
- G06K 15/00 (2006.01)
- G06K 9/00 (2006.01)
- G03F 3/08 (2006.01)

(52) U.S. Cl. ...................... 358/1.9; 358/3.03; 358/535; 358/3.23; 358/518; 382/251; 382/162; 382/167

(58) Field of Classification Search ................ 358/1.9, 358/3.03, 535, 3.23, 518; 382/251, 162, 382/167
See application file for complete search history.

(56) References Cited

U.S. PATENT DOCUMENTS

| | | | | |
|---|---|---|---|---|
| 4,924,322 A | * | 5/1990 | Kurosawa et al. | 358/448 |
| 5,621,546 A | | 4/1997 | Klassen et al. | 358/536 |
| 5,949,965 A | | 9/1999 | Gondek | 395/109 |
| 5,973,803 A | | 10/1999 | Cheung et al. | 358/534 |
| 6,999,201 B1 | * | 2/2006 | Shimizu | 358/3.04 |
| 2003/0038953 A1 | * | 2/2003 | Damera-Venkata | 358/1.9 |

FOREIGN PATENT DOCUMENTS

| | | |
|---|---|---|
| GB | 2352353 | 1/2001 |
| JP | 8-279920 | 10/1996 |
| JP | 11-10918 | 1/1999 |
| JP | 2000-354172 | 12/2000 |

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto (57) ABSTRACT

For M (magenta) and C (cyan), in a case of generating, e.g., ternary data of C0 to C2 and M0 to M2 respectively by using a look-up table on the basis of an error diffusion method, in a highlight portion of input M and C data (to which errors Ce and Me have been added respectively), a conversion space of correlating these data is used, while in a high-density portion, a conversion space equivalent to ordinary error diffusion is used. Thus, in a case of converting multivalued color image data into data of a lesser number of bits than the number of bits of color components constituting the multivalued color image data, it is possible to maintain excellent tonality on the entire image, and particularly to control graininess by preventing image quality deterioration in the highlight area.

13 Claims, 9 Drawing Sheets

◌ CYAN
○ MAGENTA
● BLUE

FIG. 9

IMAGE PROCESSING APPARATUS, IMAGE PROCESSING METHOD, COMPUTER PROGRAM AND COMPUTER-READABLE STORAGE MEDIUM

BACKGROUND OF THE INVENTION

1. Field of the Invention

The present invention relates to an image processing apparatus which converts image data representing plural colors by a given number of bits into image data of a lesser number of bits, a control method which controls the image processing apparatus, a computer program which is used to achieve the control method, and a computer-readable storage medium which stores the computer program.

2. Related Background Art

There are various apparatuses which print color images, and the basis of these apparatuses is to print the image by using recording materials (ink, toner, etc.) of three colors, namely cyan (C), magenta (M) and yellow (Y), or four colors, namely C, M, Y and black (Bk).

Ordinarily, in a printer, the image data to be printed is converted into data for the recording materials of the colors provided in the printer in accordance with a predetermined color processing parameter, and the converted data is then actually printed. Moreover, in a printer of type of discharging ink droplets, an image is represented by binary data (i.e., data whose two values respective indicate ink discharging and no ink discharging), or represented by N values larger than binary by stepwise changing the number of ink discharges.

As quantization methods, a dither method, an error diffusion method and the like are known, and, moreover, various improved techniques are conventionally known in the error diffusion method.

For example, each of Japanese Patent Application Laid-Open Nos. 8-279920, 11-10918 and 2000-354172 discloses a method of achieving a uniformly distributed and visually desirable dot arrangement by quantizing two or three different colors as mutually correlating them.

Here, such a technique will be explained with reference to FIGS. 8A and 8B.

First, cyan and magenta are selected as the two different colors. FIG. 8A shows an example of the dot arrangement in a case where an image is extremely pale and thus print dots are few, and also in a case where ordinarily the error diffusion process is performed independently for each of cyan and magenta, as in a case of the first gradation value of 255 gradations.

Figures 8A, 8B:
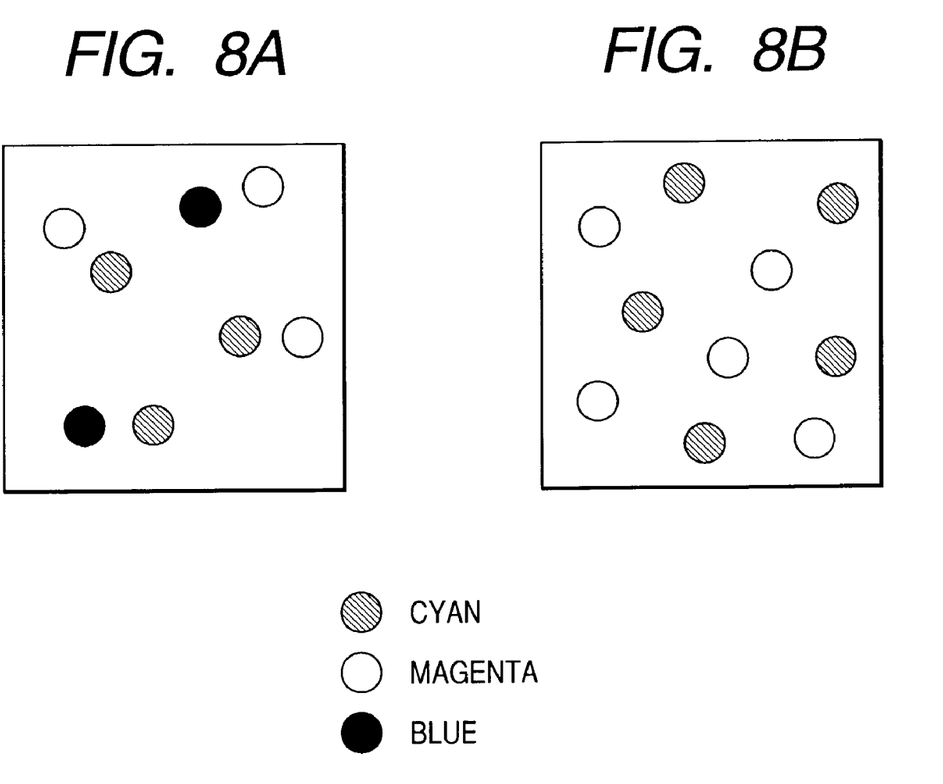
FIGS. 8A and 8B are diagrams for explaining a problem that can occur when the ordinary error diffusion method is executed for multivalued color image.

As shown in FIG. 8A, since cyan dots and magenta dots do not at all correlate, these dots are mutually close together in certain areas or mutually separated in some cases, whereby these dots can form visually unpleasant patterns. Moreover, if a cyan dot and a magenta dot overlap each other, the result is a blue dot. Since the density of blue is high, blue dots are easily recognized by human eyes, whereby such blue dots degrade the image quality by causing an unpleasant graininess.

On the other hand, FIG. 8B shows an example of the dot arrangement in a case of quantizing the cyan and magenta dots while correlating their relative positions. In this method, since the cyan and magenta dots are arranged so that these dots mutually have appropriate distances, dark blue dots do not spuriously appear, nor does any improper dot-dense portion, and the result is visually preferable.

However, the above conventional techniques merely disclose the method of correlating the dots as a whole irrespective of the gradation values (densities) of respective colors. In other words, in the above conventional techniques, the light area where the dots are well seen and the dark area where the individual dots cannot be recognized because numerous dots are printed, are treated the same.

Moreover, the inventors of the present invention found that, if error diffusion is performed with correlation of mutually different colors in all gradations, a visually unpleasant pseudo-contour may appear, and tonality (or gradation capability) might deteriorate.

Even in ordinary error diffusion, there occurs a phenomenon in which, in a given portion of an image, errors do not accumulate and thus the appearance of dots is delayed relative to their location in the image data that is input to the error diffusion processing. This phenomenon is called a "sweep-together" phenomenon.

This phenomenon occurs in light-gradation areas, where the dots are very few, and in portions where a quantization output value begins to change in a case of multivalued recording. Conversely, there is also a phenomenon in which errors are numerous and thus dots appear excessively, which is called a "sweep-out" phenomenon. This phenomenon occurs, e.g., in the gradation from dark color to light color. In the method of mutually correlating different colors, there are many change portions of the quantization output values, whereby the "sweep-together" phenomenon and the "sweep-out" phenomenon tend to occur more frequently as compared with the ordinary error diffusion. Thus, pseudo-contours and dot-dense portions appear, whereby the image quality deteriorates.

SUMMARY OF THE INVENTION

The present invention has been made to solve such a problem as above, and an object thereof is to provide an image processing apparatus and method which can maintain excellent tonality on an entire image in a case of converting the number of bits of each of color components constituting a multivalued color image into a smaller number of bits, and particularly can control graininess by preventing image quality deterioration in a highlight area, a computer program which achieves the image processing method, and a computer-readable storage medium which stores the computer program.

Another object of the present invention is to provide image processing apparatus and method which can obtain a high-quality image in both low-density (highlight) and high-density portions by adopting a two-dimensional conversion space based on a correlative ED (error diffusion) method in a portion where dots are few, i.e., a highlight portion (area), and adopting a two-dimensional space based on an ordinary ED method in a portion where dots are numerous (i.e., high-density portion), a computer program which achieves the image processing method, and a computer-readable storage medium which stores the computer program.

In order to achieve the above objects, the image processing apparatus of the present invention is characterized by an image processing apparatus which inputs and quantizes multivalued image data representing each color by plural bits into image data of a lesser number of bits, comprising an addition means for adding an error of each color that has occurred in previous quantization to the input multivalued image data of each color, and quantization means for inputting the M (M 2) multivalued image data after the addition obtained by said addition means as M addresses and outputting the data after the quantization of the respective colors in accordance with the input M addresses, where the quantization means comprises a look-up table for storing the data after the quantization in an M-dimensional space accessed by the input M addresses, and where, in the M-dimensional space, the look-up table stores, with respect to the high-density area, the data after the quantization having no correlation among address values of the respective colors and stores, with respect to the highlight area, the data after the quantization having correlation among the address values of the respective colors.

Moreover, the image processing apparatus of the present invention is characterized by an image processing apparatus which inputs and quantizes multivalued image data representing each color by plural bits into image data of a lesser number of bits, comprising an addition means for adding an error of each color that has occurred in previous quantization to the input multivalued image data of each color, and a quantization table for inputting the M (M≧2) multivalued image data after the addition obtained by the addition means as M addresses, and outputting the data after the quantization of the respective colors in accordance with the input M addresses, where the quantization table is a look-up table for storing the data after the quantization in an M-dimensional space accessed by the input M addresses, in the M-dimensional space, with respect to the high-density area, the data after the quantization having no correlation among address values of the respective colors is stored, and in the M-dimensional space, with respect to the highlight area, the data after the quantization having correlation among the address values of the respective colors is stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the present invention and, together with the description, serve to explain the principles of the present invention.

DETAILED DESCRIPTION OF THE PREFERRED EMBODIMENTS

The preferred embodiments of the present invention will now be described in detail in accordance with the accompanying drawings.

In these embodiments, a case where an ink-jet recording apparatus discharging inks of C, M and Y components and performing ternary recording for each color component is used, will be explained. Here, "ternary" represents three states: "no dot is printed", "dots are printed by one-time ink discharge" and "dots are printed by two-time ink discharge". That is, these correspond to "0", "128" and "255" in eight-bit representation. Since the ternary recording is performed, of course, each pixel has two-bit data.

Figure 1:
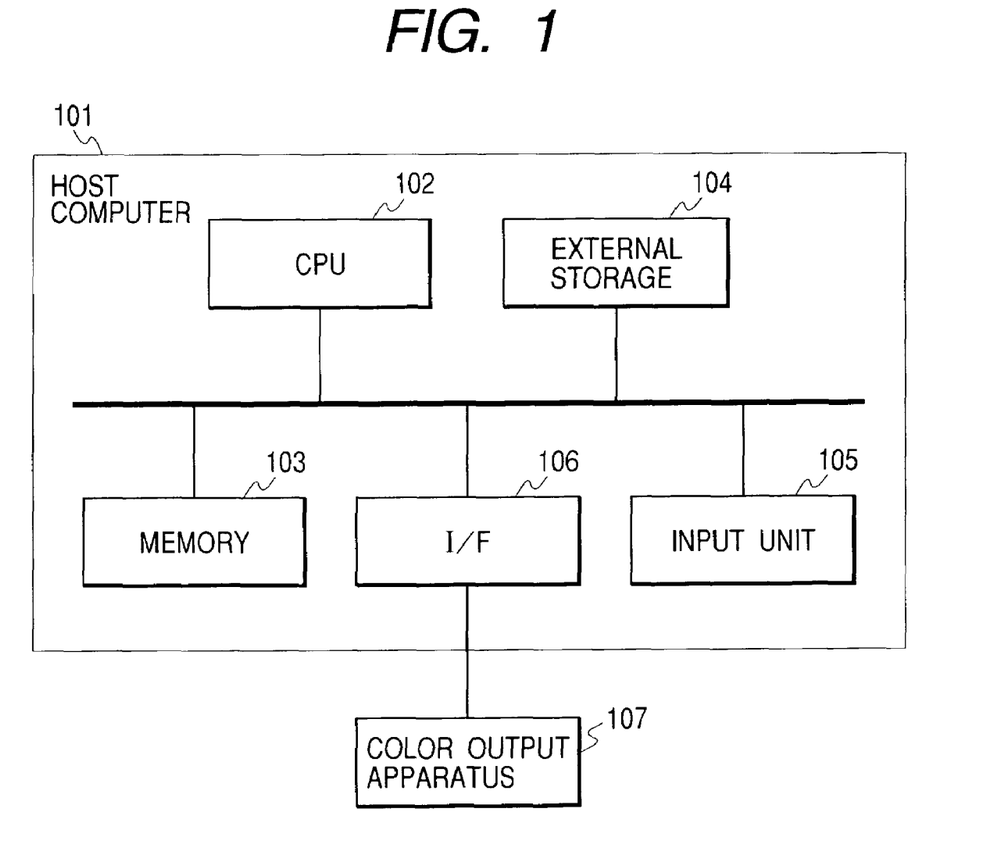
FIG. 1 is a block diagram showing the structure of an image output system according to the preferred embodiments of the invention.

FIG. 1 is a block diagram showing an image processing system according to the preferred embodiment.

In FIG. 1, a host computer 101 is equipped with a CPU 102, a memory 103, an external storage (e.g., hard disk drive) 104, an input unit 105, and an I/F (interface) 106 with a printer.

When the host computer 101 is powered on, an OS (operating system) is loaded from the external storage 104 to the memory 103, and then various application programs (simply called application hereinafter) stored in the external storage 104 can be executed. If printing is instructed from the application, a printer driver (program) starts operating to perform a coloring process, a quantization process and the like (later described) to data to be printed given from the application. The printer driver is stored in the external storage 104 or supplied from another external apparatus. The host computer 101 which is connected with a color output apparatus 107 through the I/F 106 transmits the image data subjected to the coloring process to the color output apparatus 107 to print and record the processed data.

Figure 2:
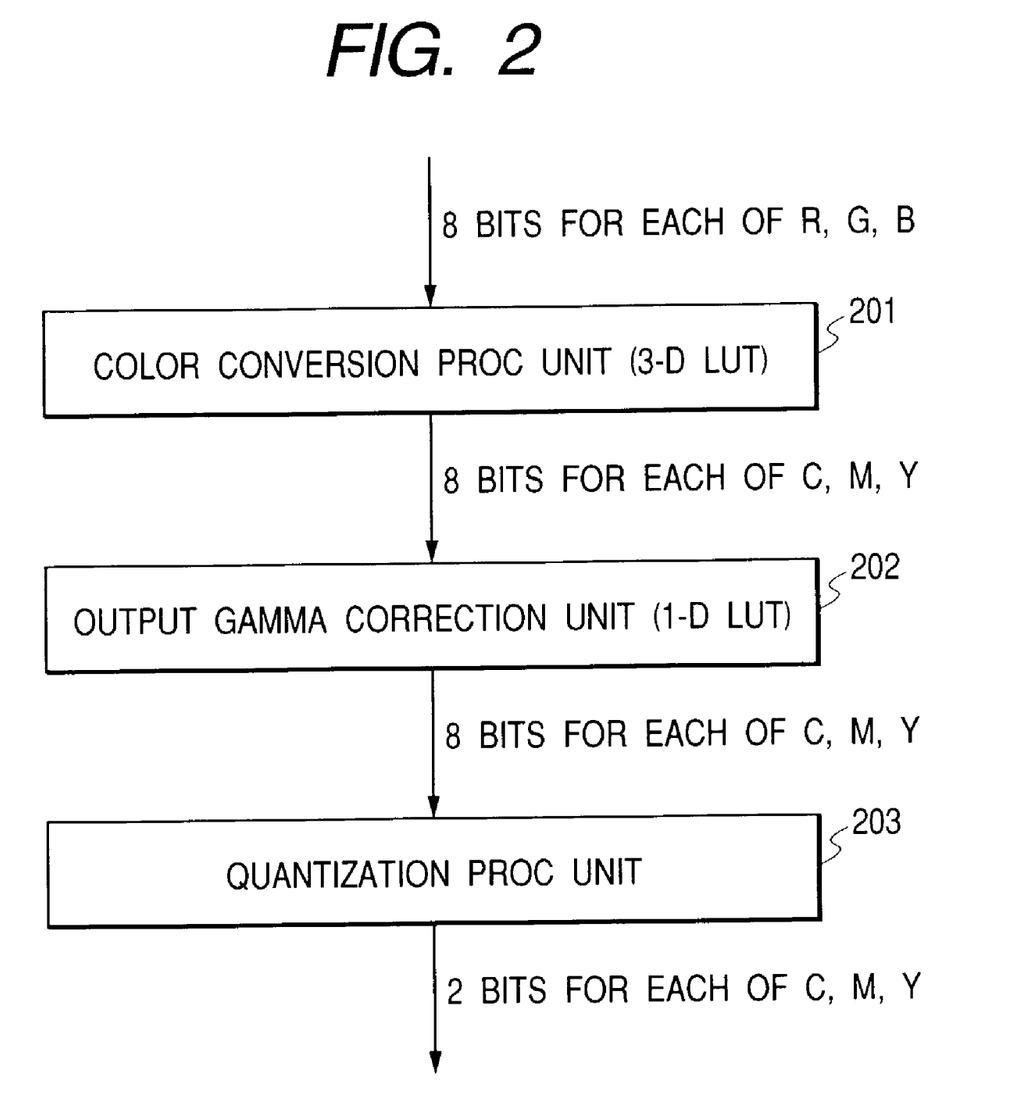
FIG. 2 is a block diagram for explaining an entire processing procedure according to the preferred embodiments.

FIG. 2 is a block diagram for explaining an entire processing procedure that input eight-bit (256 gradations) image data for each of R, G and B is output as two-bit data for each of C, M and Y.

The R, G and B eight-bit image data are first converted into C, M and Y eight-bit data (eight bits for each of C, M and Y) conformed to printer output colors, by a three-dimensional LUT (look-up table). This conversion process is to convert RGB-system colors in an input system into CMY-system colors in an output system. Although the input data is often based on three primary colors (R, G and B) according to additive color mixture of a light emitter such as a display, C, M and Y coloring materials are used in the printer, whereby the above conversion process is necessarily performed.

The three-dimensional LUT used in the coloring process discretely holds the data obtained by an interpolation process. However, the detailed explanation of the interpolation process will be omitted because it is a known technique.

Then, in an output gamma correction unit 202, the C, M and Y eight-bit image data are subjected to output gamma correction by using a one-dimensional LUT. That is, since the relation between the number of printed dots for each unit area and an output characteristic (e.g., reflection density) of the printer does not often become liner relation, the liner relation between the input level of the C, M and Y eight-bit image data and the output characteristic of the printer at this time is assured by the output gamma correction.

The above is the explanation of the operation of the coloring process to convert the R, G and B eight-bit image data into the C, M and Y eight-bit image data conformed to the coloring materials of the output apparatus.

Since the color recording apparatus in the embodiment is the ternary recording apparatus, the C, M and Y eight-bit image data are subjected to the quantization process by a next-stage quantization processing unit 203, whereby the C, M and Y two-bit image data are generated.

Figure 3:
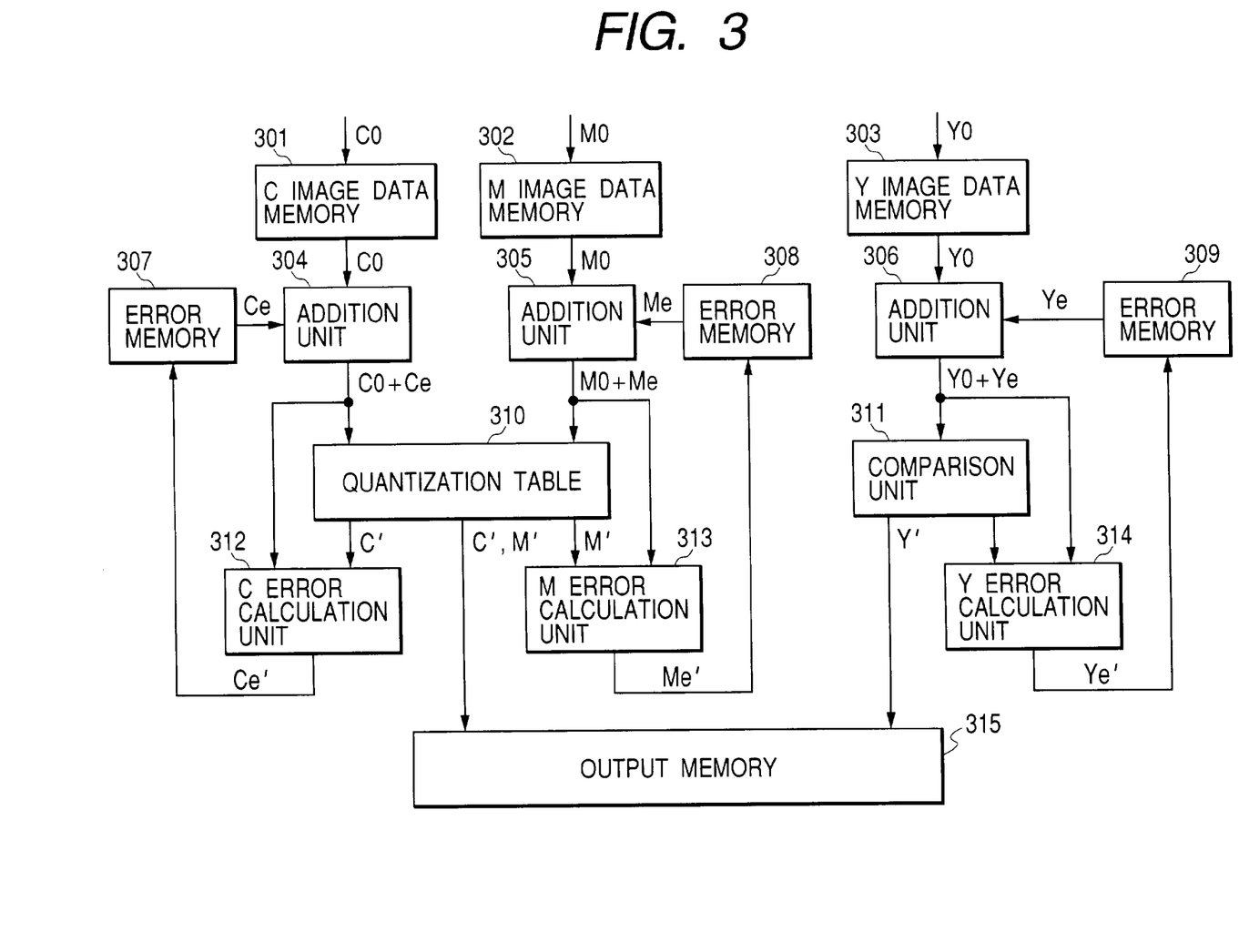
FIG. 3 is a block diagram showing the structure of a quantization processing unit according to the preferred embodiments.

FIG. 3 is a block diagram showing the structure of the quantization processing unit 203. Here, it should be noted that the quantization process in the embodiment is based on the error diffusion method.

Moreover, in the embodiment, the cyan and magenta components are subjected to the quantization as they are mutually correlated with each other, and the yellow component is subjected to the ordinary error diffusion. The reason why correlation for the yellow component is not considered is that there is no potent influence since stimulation by yellow of a human's visual sensation is small and the device structure can be resultingly simplified as a whole. In other words, it is of course possible to perform the quantization as correlating the yellow component as well as the cyan and magenta components, though the device structure somewhat becomes complicated.

First, eight-bit image data C0, M0 and Y0 (i.e., the data obtained after the gamma correction in FIG. 2) of an attention pixel are input respectively to C, M and Y image data memories 301, 302 and 303.

Then, the image data are read synchronously from the C, M and Y image data memories 301, 302 and 303, and errors Ce, Me and Ye (respectively stored in error memories 307, 308 and 309) occurred in previous quantization and accumulatively added at the attention pixel position are added to the read image data respectively by addition units 304, 305 and 306.

The cyan and magenta components constituting the attention pixel are quantized by a common (shared) quantization table 310, whereby quantized outputs C' and M' (each two bits) are supplied to an output memory 315. At the same time, errors Ce' and Me' that have occurred in this quantization process are calculated and written respectively in error memories 307 and 308 by C and M error calculation units 312 and 313, so that these errors are distributed to an unquantized pixel group on the periphery of the attention pixel according to predetermined weighting coefficients. On the other hand, the yellow component is compared with thresholds (there are two thresholds because the ternary process) by a comparison unit 311 in the ordinary error diffusion method, whereby a quantized output Y' (also two bits) is produced. Like the cyan and magenta components, an error Ye' is calculated by an error calculation unit 314 and output to the error memory 309 so that this error is distributed to an unquantized pixel position of the yellow component of the attention pixel.

The quantization table 310 in the embodiment will be further explained in detail.

Figure 4:
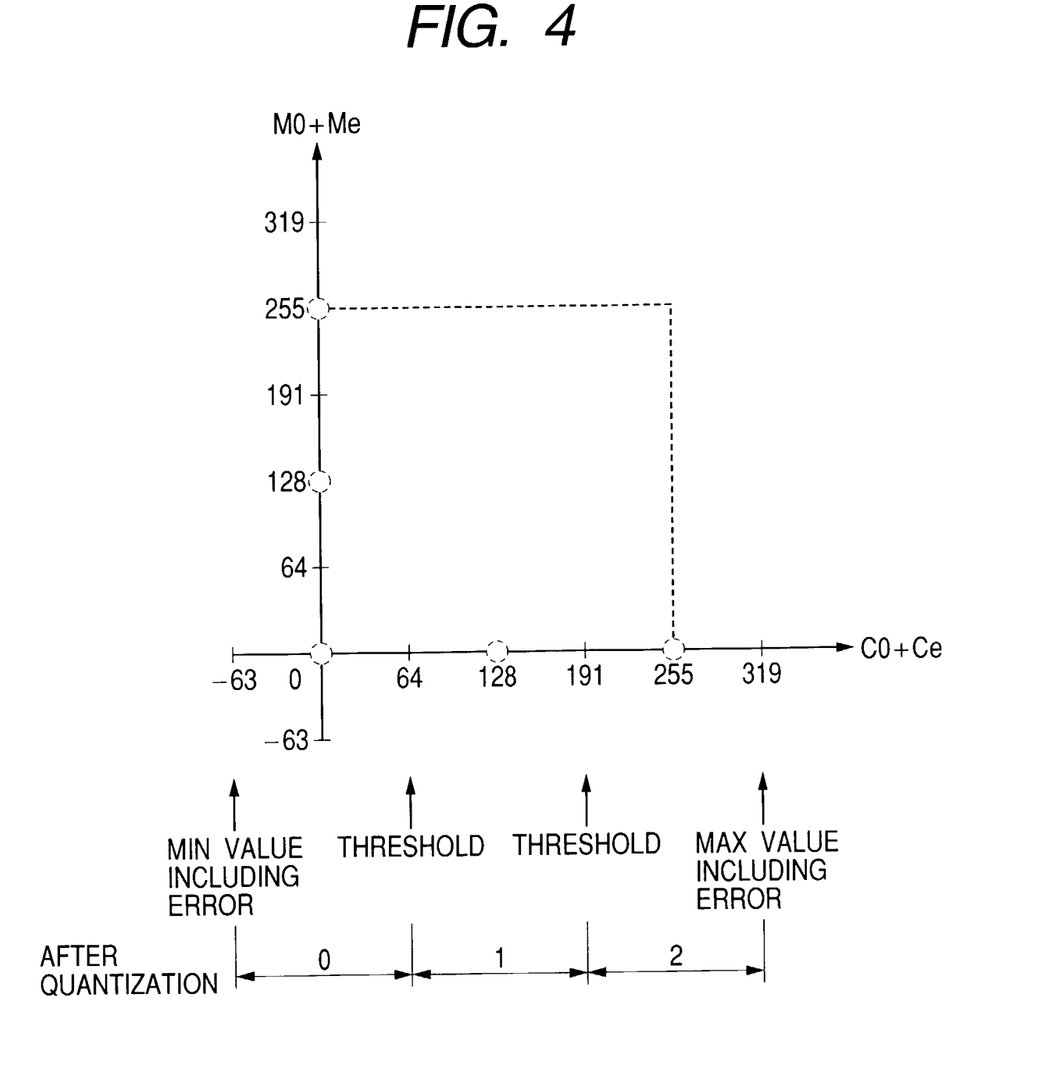
FIG. 4 is a diagram showing an address space of a quantization table shown in FIG. 3.

FIG. 4 is a diagram showing an outline of the structure of the quantization table. In FIG. 4, the axis of abscissas indicates input data C0+Ce for cyan, and the axis of ordinate indicates input data M0+Me for magenta.

Since the recording apparatus in the embodiment treats the ternary data, the thresholds to be used are "64" and "191", and the values after the quantization are "0", "128"
and "255" (i.e., "00", "01" and "10" in binary). These values respectively correspond to "no dot is printed (no ink discharge)", "dots are printed by one-time ink discharge" and "dots are printed by two-time ink discharge". The image data of each color component of the attention pixel are represented by "0" to "255", and the error may occur within the range "−64" to "+64". That is, the minimum value of each of the data C0+Ce and the data M0+Me after the error is added is "−63", and the maximum value thereof is "319".

The M data is converted into the ternary data "0", "1", "2" according to which of the areas "0 to 64", "64 to 191" and "191 to 255" the value of the data M0+Me for magenta exists in, and the C data is similarly converted into the ternary data. In this case, if the ordinary error diffusion method (hereinafter called ED method) is used, the two-dimensional conversion space of magenta and cyan in FIG. 4 can be represented as shown in FIG. 5A.

Figure 5A:
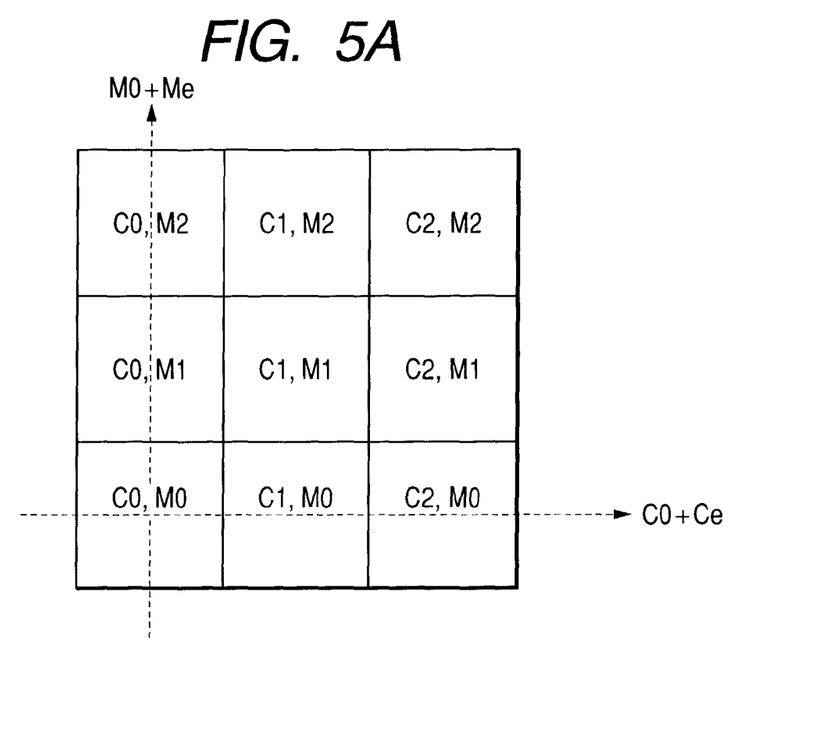
FIGS. 5A and 5B are diagrams respectively showing the quantization table for performing a process equivalent to an ordinary error diffusion method and the quantization table for performing a correlative error diffusion method.

In FIG. 5A, the numeric values on the right of C and M of the color components respectively indicate the values C' and M' after the quantization (see FIG. 3). For example, an area "C1, M1" indicates C'=1 and M'=1, and this is similar for other areas.

Incidentally, density recognized by a human's visual sensation (hereinafter called "visual density") can be considered as the density of the combination of cyan and magenta. That is, in FIG. 5A, the visual density of the area "C0, M0" is 0+0=0, the visual density of the area "C0, M1" is 0+1=1, and the visual density of the area "C1, M1" is 1+1=2.

The problem in FIG. 5A is that there is no correlation between cyan and magenta, and so, more particularly, a highlight (low density) area such as the area "C0, M0" is consecutive with the area "C1, M1" through their mutual apexes, and the difference in density between these areas is large because the visual density of the former area is "0" and the visual density of the latter area is "1". Therefore, if an image of which the cyan and magenta densities are close to the apexes is input, it is easy for the previously explained state shown in FIG. 8A to occur.

Figure 5B:
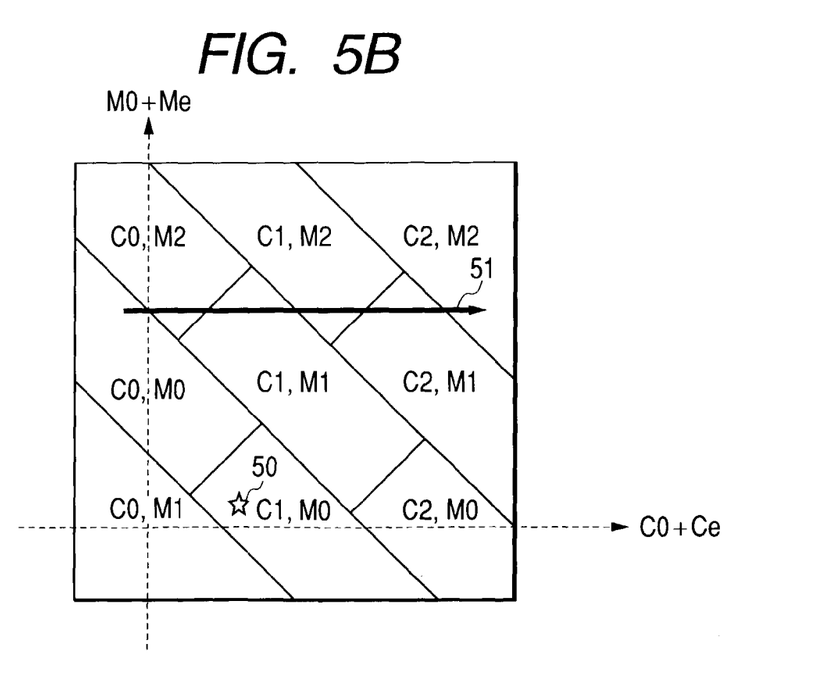

On the other hand, FIG. 5B shows the two-dimensional conversion space of cyan and magenta for the values of the values of the data C0+Ce and M0+Me in a case of executing the error diffusion method as correlating cyan and magenta (hereinafter this method is called correlative ED method). Like FIG. 5A, the numeric values on the right of C and M in FIG. 5B respectively indicate the values after the quantization.

In FIG. 5B, if it pays attention to the relation between the area "C0, M0" and the area "C1, M1", it can be understood that these areas are spatially separated from each other. More particularly, the area "C1, M0" (visual density=1) or the area "C0, M1" (visual density=1) exists between the area "C0, M0" (visual density=0) and the area "C1, M1" (visual density=2), whereby it is possible to reduce that the cyan component and the magenta component overlap in the highlight area. In other words, in FIG. 5B, the areas of different visual densities do not overlap according to the density direction toward the upper right corner from the lower left corner, and the areas are arranged according to the visual densities.

Moreover, a case of the numerical values C0+Ce=+54 and M0+Me=+20 is considered (i.e., the values at the point indicated by a star sign 50 in FIG. 5B). In the ordinary ED method (FIG. 5A), since either the above numerical values are smaller than the threshold "64", either the values C' and M' after the quantization are "0", whereby no dot is printed in the pixel in question. On the other hand, in the correlative ED method (FIG. 5B), since the star sign 50 is within the area "C1, M0", the values C'=1 and M'=0 are given, whereby a cyan ink of one dot is printed in the pixel in question. Thus, the output value which is natural with respect to the input value can be obtained.

As above, if one adopts this technique that pays attention to highlight portions, it can be understood that, in the quantization table 310, the two-dimensional conversion space of FIG. 5B based on the correlative ED method is excellent in image quality as compared with that of FIG. 5A based on the ordinary ED method.

Here, the image data in which the value M0+Me is approximately constant and the value C0+Ce gradually increases is considered. The image data like this represents a pattern which comparatively exists, e.g., in the gradation from magenta to blue, or the like. An example of this image data is indicated by an arrow 51 shown in FIG. 5B. At this time, the value C' after the quantization monotonously increases like "0"→"0"→"1"→"2"→"2", while the value M' after the quantization rapidly changes like "1"→"2"→"1"→"2"→"1"→"2". Due to such a rapid change, a "sweep-together" phenomenon occurs, whereby a pseudo-contour and unsmoothed gradation appear. Thus, a dot-dense portion where visual density is high appears, whereby the image quality deteriorates.

Therefore, in the embodiment, the two-dimensional conversion space based on the correlative ED method shown in FIG. 5B is adopted for portions where the dots are few, i.e., for highlight portions (areas), and the two-dimensional conversion space based on the ordinary ED method shown in FIG. 5A is adopted for portions where numerous dots exist (high-density portions).

Even doing so, the dots mutually huddling together are printed in the area (high-density area) where the numerous dots are printed. Therefore, since each dot is not recognized in this area, it is unnecessary to intentionally diffuse the cyan and magenta dots, and thus the image quality does not deteriorate.

Next, the conversion space in the quantization table 203 according to the embodiment will be further explained.

Figure 6A:
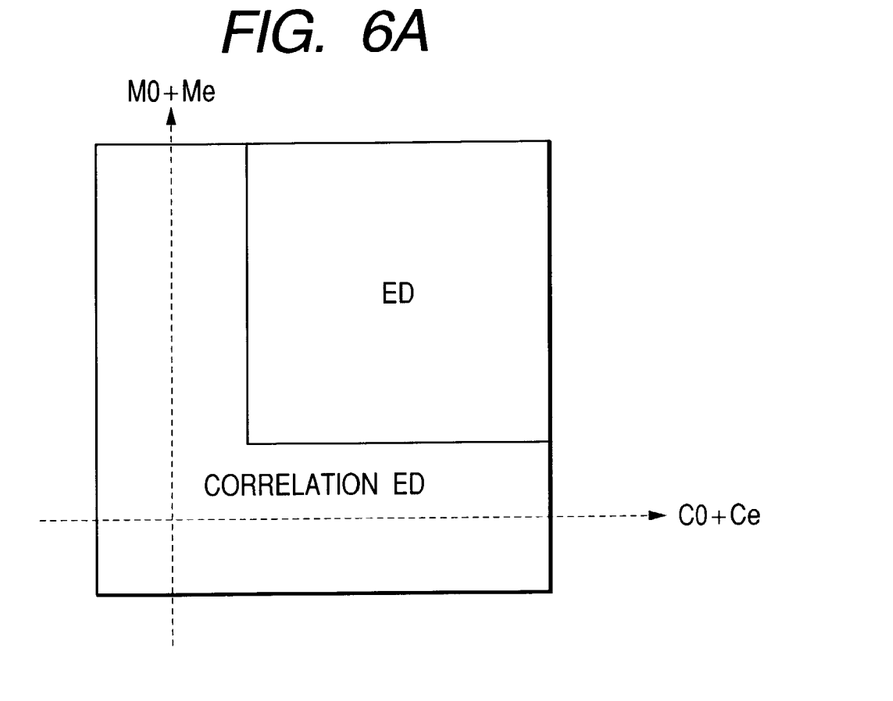
FIGS. 6A and 6B are diagrams respectively showing an area of two-dimensional conversion space adopting the ordinary error diffusion method and an area of two-dimensional conversion space adopting the correlative error diffusion method.

FIG. 6A shows that the two-dimensional conversion space based on the correlative ED method shown in FIG. 5B is adopted to the highlight area where the value C0+Ce or M0+Me is "0", and the two-dimensional conversion space based on the ordinary ED method shown in FIG. 5A is adopted for areas whose density is higher than that of the highlight areas. That is, in the highlight portions, where the dots are remarkable, the quantization by which the dots are diffused (i.e., the magenta and cyan dots do not overlap easily) is performed, whereby the image quality does not deteriorate. Then, the conversion space in the quantization table 203 as a result of overlapping the two-dimensional conversion spaces shown in FIGS. 5A and 5B like the above is obtained as shown in FIG. 6B.

Figure 6B:
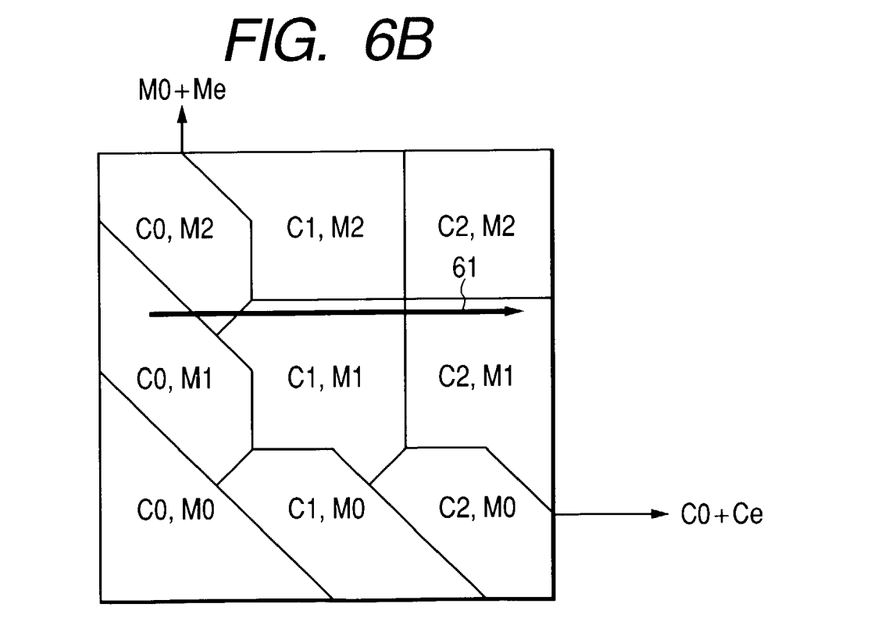

Like the above explanation, the gradation in which the value M0+Me is approximately constant and the value C0+Ce gradually increases is considered (an arrow 61 shown in FIG. 6B).

In the drawing, the value C' after the quantization monotonously increases like "0"→"0"→"1"→"2" in the same manner as above, while the value M' after the quantization rapidly changes like "1"→"2"→"1"→"1", that is, the variation of the value M' is small as compared with the case shown in FIG. 5B. Therefore, magenta can be more smoothly represented, and the factor to deteriorate the image quality decreases, whereby higher image quality can be achieved.

Here, it should be noted that the coordinate space for the conversion in the quantization table 203 is not limited to that shown in FIG. 6B. For example, FIG. 7A shows that the two-dimensional conversion space based on the correlative ED method is allocated to the area where the visual density is "1" and below, i.e., the area where (C0+Ce)+(M0+Me)=0 and (C0+Ce)+(M0+Me)=1 are satisfied, and the two-dimensional conversion space based on the ordinary ED method is allocated to the area where the visual density exceeds "1".

Since cyan and magenta do not mutually become "1" easily in the highlight portion where the dots are remarkable, the image quality in the highlight portion is high.

Figure 7A:
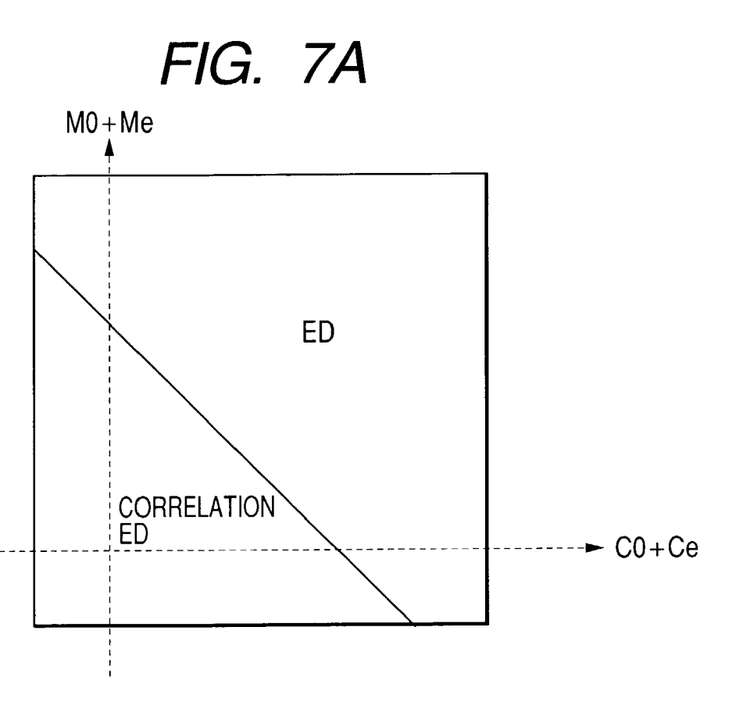
FIGS. 7A and 7B are diagrams showing another example of the area of two-dimensional conversion space adopting the ordinary error diffusion method and the area of two-dimensional conversion space adopting the correlative error diffusion method.
Figure 7B:
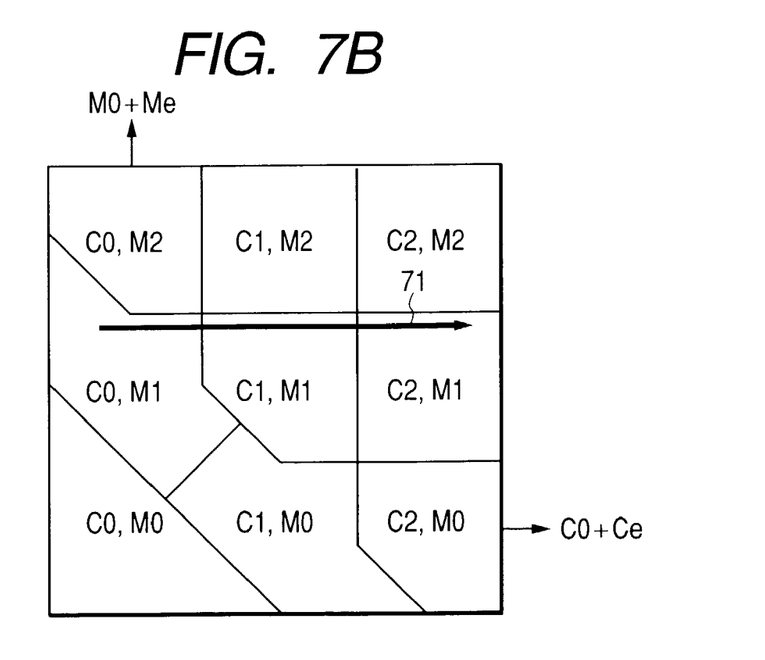

FIG. 7B shows the two-dimensional conversion space in the quantization table 203, based on the state shown in FIG. 7A.

Like the above, the example that the value M0+Me is approximately constant and the value C0+Ce gradually increases is indicated by an arrow 71 of FIG. 7B. In this case, of course the value C' after the quantization monotonously increases like "0"→"1"→"1"→"2", while the value M' after the quantization does not change like "1"→"1"→"1". Thus, magenta can be more smoothly represented, and the factor to deteriorate the image quality decreases, whereby higher image quality can be achieved.

It should be noted that the present invention is not limited to the embodiment, that is, various applications can be thought. For example, the present invention is applicable to a binary printer, a ternary printer, and a four-value printer in some cases. In other words, it is possible to say that the present invention is applicable to an N-value generation technique (N≧2).

It is explained in the embodiment that the highlight area by the cyan and magenta components is "1" or below in the ternary representation. However, the ink-jet printer might use Y, M, C and Bk four-color components, whereby the boundary between the two-dimensional conversion space based on the correlative ED method and the two-dimensional conversion space based on the ordinary ED method can be appropriately changed in accordance with the printer to be used.

Moreover, it is explained in connection with the foregoing embodiment that the yellow component is set to be independent of the magenta and cyan components. However, it is possible to define a conversion space based on the correlative ED method, in which the yellow component is included together with the magenta and cyan components. In this case, the defined space is the three-dimensional conversion space because there are three input addresses.

Moreover, as described above, the recording color components are not limited to the three components, that is, four and more, in some cases, color components might be used. Therefore, the present invention is of course applicable not only to the two- and three-dimensional conversion spaces but also to an M-dimensional conversion space (M≧2).

Moreover, the process procedure of FIG. 2 in the embodiment is desirably applied to the printer driver running on the host computer. That is, the printer driver is one software, and the operation procedure thereof acts on the process procedure shown in FIG. 2. Moreover, in the quantization process, the portion corresponding to the quantization table 310 in FIG. 3 can be achieved by adopting a two-dimensional arrangement variable (output value thereof is given by four bits (=2+2 bits)). That is, it only has to define the arrangement variable as lut(,), store the data (four bits) in advance as in FIG. 6B, extract the four bits by substituting lut(M0+Me, C0+Ce), and then decompose the extracted four bits into two bits.

Figure 9:
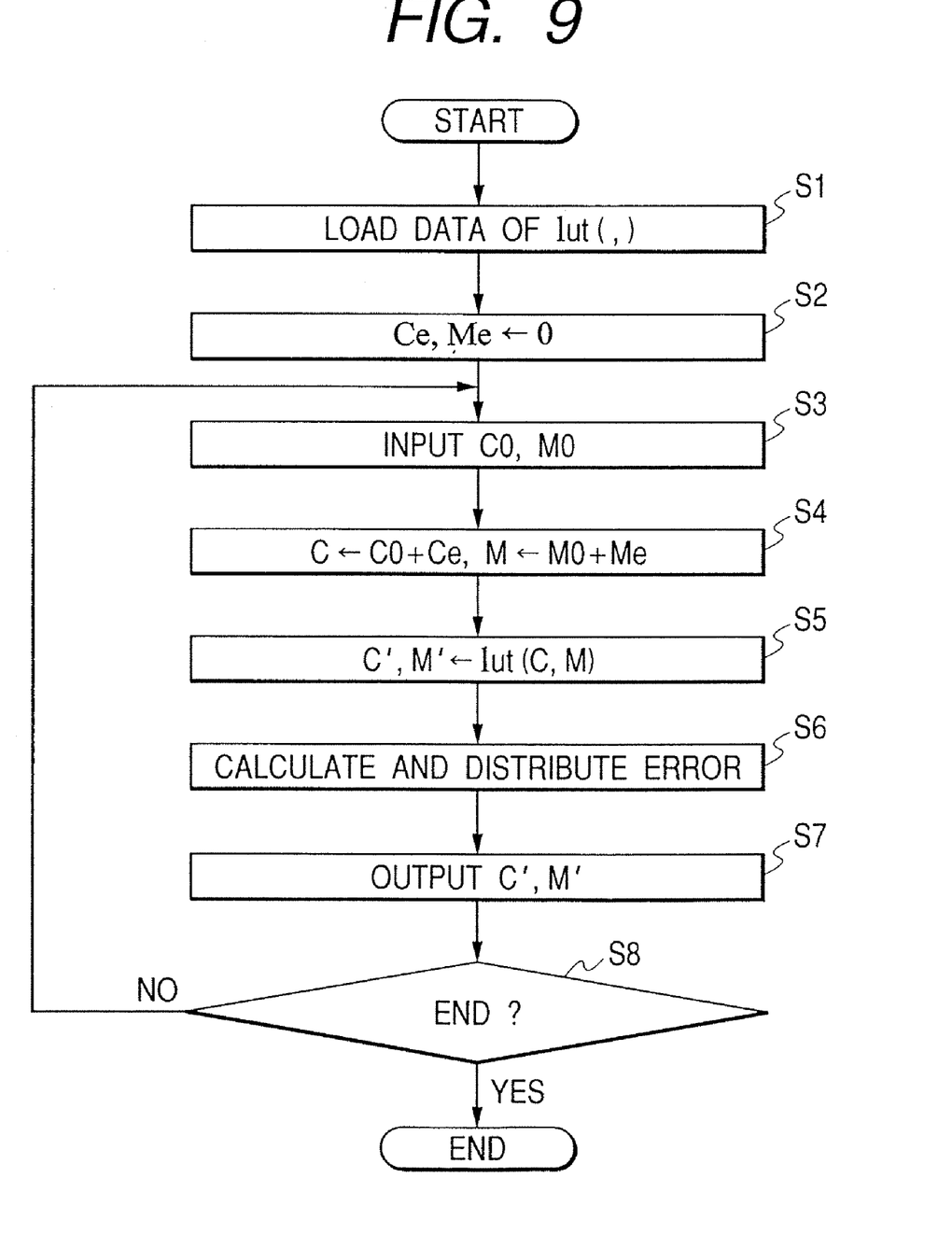
FIG. 9 is a flow chart showing a processing procedure for achieving processes in the preferred embodiments, by a printer driver.

FIG. 9 is a flow chart showing an example of the above process.

In the following explanation of the flow chart, it is assumed that the arrangement variable lut(,) has been stored in advance in a memory, and the data obtained from the application have been already converted into the C, M and Y data in the run-up to the process. With respect to the Y component, it is judged which of the areas "0 to 64", "65 to 190" and "191 to 255" the input value (already error added) exists in, and the judged result is set to "0", "1" or "2". Therefore, to conform to the above embodiment, only the C and M components will be explained hereinafter.

First, in step S1, the data is read from a hard disk or the like to lut(,) storing the respective error values of cyan and magenta. Although the data may be previously stored, if the data is externally loaded, there are advantages that it is possible to conform the contents of the loaded data to the kind of apparatus and moreover change the contents in some cases.

Next, in step S2, the error variables Ce and Me are cleared to "0".

After then, in step S3, the multivalued data C0 and M0 of cyan and magenta are input. In step S4, the results to which the errors have been added are stored as variables C and M, the obtained variables C and M are substituted to the arrangement variable lut(,), and the data C' and M' after the quantization are obtained based on the substitution result (step S5). Then, the errors are calculated in preparation for the next quantization, the calculated errors are distributed to an unquantized pixel position, and the data C' and M' after the quantization are output (steps S6 and S7).

Subsequently, the process in and after step S3 is repeated until it is judged in step S8 that processing of all the pixels currently being processed, has ended.

As described above, it is thus apparent that the present invention can be achieved by a computer program (particularly a printer driver).

The computer program such as the printer driver or the like can be executed ordinarily when a storage medium such as a floppy disk, a CD-ROM or the like is set in a multi-purpose apparatus such as a personal computer or the like and then the computer program stored in the storage medium is copied or installed to a hard disk in the multi-purpose apparatus, whereby also the storage medium like this is included in the present invention.

Moreover, in the preferred embodiments, the ink-jet printer which discharges ink droplets is explained by way of example. However, a print system is not limited to this, that is, an electrophotographic printer (a laser beam printer or the like) which uses toner as the recording material instead of the ink droplets can be used. Besides, a printer of any other print system can be used if this system can perform high-resolution printing.

Moreover, in the preferred embodiments, the processed data is output to the printer. Besides, it is of course possible to store the processed data as a file and display the processed data on a display apparatus capable of representing gradation by N values. In case of outputting and displaying the data on the display, the above embodiment is applicable by substituting "brightness" for "density" in the disclosure of the specification.

The present invention is applicable to a system constituted by plural devices, or to an apparatus comprising a single device. Furthermore, it goes without saying that the present invention is applicable also to a case where the object of the invention is attained by supplying a program to the system or the apparatus.

As many apparently widely different embodiments of the present invention can be made without departing from the spirit and scope thereof, that is, it is to be understood that the present invention is not limited to the specific embodiments thereof expect as defined in the appended claims.

The invention claimed is:

1. An image processing apparatus which inputs and quantizes multivalued image data representing each color by plural bits into image data of a lesser number of bits, comprising:
    addition means for adding an error of each color that has occurred in previous quantization to the input multivalued image data of each color; and
    quantization means for inputting the M (M≧2) multivalued image data after the addition obtained by said addition means as M addresses and outputting the data after the quantization of the respective colors in accordance with the input M addresses,
    wherein said quantization means comprises a look-up table for storing the data after the quantization in an M-dimensional space accessed by the input M addresses, and
    wherein, in said M-dimensional space, the look-up table stores, with respect to the high-density area, the data after the quantization having no correlation among address values of the respective colors and stores, with respect to the highlight area, the data after the quantization having correlation among the address values of the respective colors, such that dots of one of the respective colors are arranged with appropriate distances from dots of another of the respective colors.

2. An apparatus according to claim 1, wherein
    the multivalued image data is composed of cyan, magenta and yellow components,
    said quantization means makes the quantization process different for the cyan and magenta components in accordance with the positions in a two-dimensional space, and
    said quantization means performs the quantization for the yellow component by comparing it with a preset threshold.

3. An image processing method which inputs and quantizes multivalued image data representing each color by plural bits into image data of a lesser number of bits, comprising:
    an addition step of adding an error of each color that has occurred in previous quantization to the input multivalued image data of each color; and
    a quantization step of inputting the M (M≧2) multivalued image data after the addition obtained in said addition step as M addresses and outputting the data after the quantization of the respective colors in accordance with the input M addresses,
    wherein said quantization step is performed using a look-up table for storing the data after the quantization in an M-dimensional space accessed by the input M addresses, and
    wherein, in said M-dimensional space, the look-up table stores, with respect to the high-density area, the data after the quantization having no correlation among address values of the respective colors and stores, with respect to the highlight area, the data after the quantization having correlation among the address values of the respective colors, such that dots of one of the respective colors are arranged with appropriate distances from dots of another of the respective colors.

4. A method according to claim 3, wherein
the multivalued image data is composed of cyan, magenta and yellow components,
in said quantization step the quantization process is different for the cyan and magenta components in accordance with the positions in a two-dimensional space, and
in said quantization step the quantization for the yellow component is performed by comparing it with a preset threshold.

5. A computer program which functions as an image processing apparatus for inputting and quantizing multivalued image data representing each color by plural bits into image data of a lesser number of bits, said program comprising:
a program code for an addition step of adding an error of each color that has occurred in previous quantization to the input multivalued image data of each color; and
a program code for a quantization step of inputting the M (M≧2) multivalued image data after the addition obtained in said addition step as M addresses and outputting the data after the quantization of the respective colors in accordance with the input M addresses,
wherein said quantization step is performed using a look-up table for storing the data after the quantization in an M-dimensional space accessed by the input M addresses, and
wherein, in said M-dimensional space, the look-up table stores, with respect to the high-density area, the data after the quantization having no correlation among address values of the respective colors and stores, with respect to the highlight area, the data after the quantization having correlation among the address values of the respective colors, such that dots of one of the respective colors are arranged with appropriate distances from dots of another of the respective colors.

6. A program code according to claim 5, wherein
the multivalued image data is composed of cyan, magenta and yellow components,
the program code for said quantization step makes the quantization process different for the cyan and magenta components in accordance with the positions in a two-dimensional space, and
the program code for said quantization step performs the quantization for the yellow component by comparing it with a preset threshold.

7. A computer-readable storage medium which stores a computer program functioning as an image processing apparatus for inputting and quantizing multivalued image data representing each color by plural bits into image data of a lesser number of bits, said program comprising:
a program code for an addition step of adding an error of each color that has occurred in previous quantization to the input multivalued image data of each color; and
a program code for a quantization step of inputting the M (M≧2) multivalued image data after the addition obtained in said addition step as M addresses and outputting the data after the quantization of the respective colors in accordance with the input M addresses,
wherein said quantization step is performed using a look-up table for storing the data after the quantization in an M-dimensional space accessed by the input M addresses, and
wherein, in said M-dimensional space, the look-up table stores, with respect to the high-density area, the data after the quantization having no correlation among address values of the respective colors and stores, with respect to the highlight area, the data after the quantization having correlation among the address values of the respective colors, such that dots of one of the respective colors are arranged with appropriate distances from dots of another of the respective colors.

8. An image processing apparatus which inputs and quantizes multivalued image data representing each color by plural bits into image data of a lesser number of bits, comprising:
addition means for adding an error of each color that has occurred in previous quantization to the input multivalued image data of each color; and
a quantization table for inputting the M (M≧2) multivalued image data after the addition obtained by said addition means as M addresses, and outputting the data after the quantization of the respective colors in accordance with the input M addresses,
wherein said quantization table is a look-up table for storing the data after the quantization in an M-dimensional space accessed by the input M addresses,
in said M-dimensional space, with respect to the high-density area, the data after the quantization having no correlation among address values of the respective colors is stored, and
in said M-dimensional space, with respect to the highlight area, the data after the quantization having correlation among the address values of the respective colors is stored, such that dots of one of the respective colors are arranged with appropriate distances from dots of another of the respective colors.

9. An apparatus according to claim 8, wherein
the multivalued image data is composed of cyan, magenta and yellow components,
said quantization table is a look-up table in a two-dimensional space for the cyan and magenta components, and
the yellow component is quantized by comparing it with a preset threshold.

10. An apparatus according to claim 8, further comprising output means for outputting the data after the quantization performed by said quantization means to print means to print the output data.

11. An image processing method which inputs and quantizes multivalued image data representing each color by plural bits into image data of a lesser number of bits, comprising:
an addition step of adding an error of each color that has occurred in previous quantization to the input multivalued image data of each color; and
a quantization step, by using a quantization table, of inputting the M (M≧2) multivalued image data after the addition obtained in said addition step as M addresses, and outputting the data after the quantization of the respective colors in accordance with the input M addresses,
wherein the quantization table is a look-up table for storing the data after the quantization in an M-dimensional space accessed by the input M addresses,
in the M-dimensional space, with respect to the high-density area, the data after the quantization having no correlation among address values of the respective colors is stored, and
in the M-dimensional space, with respect to the highlight area, the data after the quantization having correlation among the address values of the respective colors is stored, such that dots of one of the respective colors are arranged with appropriate distances from dots of another of the respective colors.

12. A computer program which functions as an image processing apparatus for inputting and quantizing multivalued image data representing each color by plural bits into image data of a lesser number of bits, said program comprising:

a program code for an addition step of adding an error of each color that has occurred in previous quantization to the input multivalued image data of each color; and a program code for a quantization step, by using a quantization table, of inputting the M (M≧2) multivalued image data after the addition obtained in said addition step as M addresses, and outputting the data after the quantization of the respective colors in accordance with the input M addresses, wherein the quantization table is a look-up table for storing the data after the quantization in an M-dimensional space accessed by the input M addresses, in the M-dimensional space, with respect to the high-density area, the data after the quantization having no correlation among address values of the respective colors is stored, and in the M-dimensional space, with respect to the highlight area, the data after the quantization having correlation among the address values of the respective colors is stored, such that dots of one of the respective colors are arranged with appropriate distances from dots of another of the respective colors.

13. A computer-readable storage medium which stores a computer program functioning as an image processing apparatus for inputting and quantizing multivalued image data representing each color by plural bits into image data of a lesser number of bits, said program comprising:

a program code for an addition step of adding an error of each color that has occurred in previous quantization to the input multivalued image data of each color; and a program code for a quantization step, by using a quantization table, of inputting the M (M≧2) multivalued image data after the addition obtained in said addition step as M addresses, and outputting the data after the quantization of the respective colors in accordance with the input M addresses, wherein the quantization table is a look-up table for storing the data after the quantization in an M-dimensional space accessed by the input M addresses, in the M-dimensional space, with respect to the high-density area, the data after the quantization having no correlation among address values of the respective colors is stored, and in the M-dimensional space, with respect to the highlight area, the data after the quantization having correlation among the address values of the respective colors is stored, such that dots of one of the respective colors are arranged with appropriate distances from dots of another of the respective colors.

* * * * *

UNITED STATES PATENT AND TRADEMARK OFFICE
CERTIFICATE OF CORRECTION

| | |
|---|---|
| PATENT NO. | : 7,327,491 B2 |
| APPLICATION NO. | : 10/259624 |
| DATED | : February 5, 2008 |
| INVENTOR(S) | : Minako Kato et al. |

It is certified that error appears in the above-identified patent and that said Letters Patent is hereby corrected as shown below:

<u>COLUMN 1</u>

Line 26, "type" should read --the type--; and
Line 28, "respective" should read --respectively--.

<u>COLUMN 2</u>

Line 64, "M (M 2)" should read --M (M $\geq$ 2)--.

<u>COLUMN 4</u>

Line 67, "liner" (both occurrences) should read --linear--.

<u>COLUMN 5</u>

Line 62, "abscissas" should read --abscissa--.

<u>COLUMN 12</u>

Line 41, "said quantization means" should read --quantization table--.

Signed and Sealed this

Third Day of March, 2009

JOHN DOLL
*Acting Director of the United States Patent and Trademark Office*